US006565108B1

(12) United States Patent
Gearhart

(10) Patent No.: US 6,565,108 B1
(45) Date of Patent: May 20, 2003

(54) LOCKING MECHANISM FOR TRAILER-PULLING ASSEMBLIES

(76) Inventor: Brian O. Gearhart, 6599 Osage, Allen Park, MI (US) 48101

( * ) Notice: Subject to any disclaimer, the term of this patent is extended or adjusted under 35 U.S.C. 154(b) by 61 days.

(21) Appl. No.: 09/382,735

(22) Filed: Aug. 25, 1999

(51) Int. Cl.$^7$ .............................................. B62D 53/08
(52) U.S. Cl. .................... 280/432; 280/476.1
(58) Field of Search ............................. 280/432, 476.1

(56) References Cited

U.S. PATENT DOCUMENTS

| 3,031,205 A | * | 4/1962 | Fox | |
|---|---|---|---|---|
| 3,733,090 A | * | 5/1973 | Keller | 280/432 |
| 4,341,395 A | * | 7/1982 | Miller et al. | 280/432 |
| 4,438,943 A | * | 3/1984 | Hebert | 280/432 |
| 4,775,165 A | | 10/1988 | Grovum | 280/432 |
| 4,898,399 A | * | 2/1990 | Adams | 280/408 |
| 5,098,115 A | | 3/1992 | Haire et al. | 280/476.1 |
| 5,456,483 A | | 10/1995 | Madsen et al. | 280/432 |
| 5,690,347 A | * | 11/1997 | Juergens et al. | 280/432 |

\* cited by examiner

Primary Examiner—Kevin Hurley

(74) Attorney, Agent, or Firm—Gifford, Krass, Groh, Sprinkle, Anderson & Citkowski, PC

(57) ABSTRACT

A locking mechanism for an articulating trailer of the type which couples to a king-pin plate provides an arrangement for locking the trailer in a non-articulated position while allowing the king-pin plate to continue pivoting. One or more apertures are formed on one of the trailer and the trailer-pulling unit, and one or more powered locking members are disposed on the other of the trailer and trailer-pulling unit. Each member is moveable between an extended position, wherein it engages with a respective aperture, and a retracted position, wherein the member is disengaged from the aperture. Each member is positioned along a line parallel to the axis about which the king-pin plate pivots, enabling the plate to continue pivoting even when the members are extended. The aperture is also preferably oval shaped to allow for unimpeded pivoting of the trailer attached to the king-pin plate while the locking member is engaged within the aperture. In the preferred embodiment, the aperture is formed on the trailer, and the powered locking member is supported on the trailer-pulling unit. In addition, two sets of powered locking members and associated apertures are preferably used, one set on either side of the king-pin plate. The locking member is preferably pneumatically powered, though hydraulic, mechanical or other alternatives may be employed. The invention is applicable to a variety of implementations, including roll-off type trailers and dump trailers using "joe-dog" configurations.

6 Claims, 1 Drawing Sheet

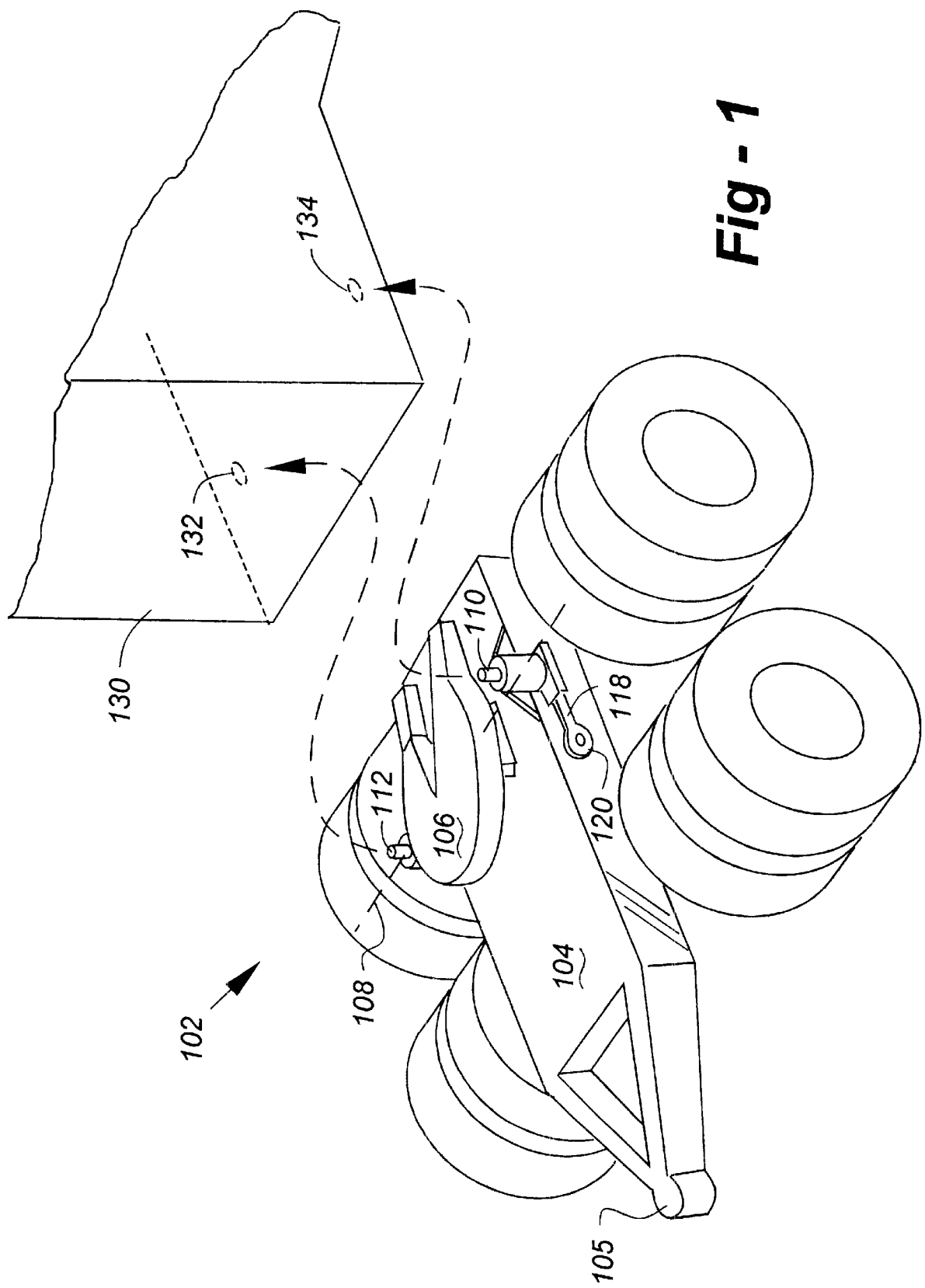

LOCKING MECHANISM FOR TRAILER-PULLING ASSEMBLIES

FIELD OF THE INVENTION

This invention relates generally to trailers and pulling vehicles and, in particular, to trailers interconnected by way of a king-pin plate and means for locking the trailer in a non-articulating configuration while allowing the king-pin plate to pivot.

BACKGROUND OF THE INVENTION

Vehicles with articulating trailers may be quite difficult to operate in reverse without assuming unworkable or even jack-knife situations. The problem becomes much more pronounced when additional points of articulation are added. For example, in tandem configurations interconnected by a converter dolly or "joe-dog," three points of articulation may be created, exacerbating the problem. These four parts of articulation include the first king-pin plate or fifth-wheel interconnection between the tractor and first trailer, a second part of articulation between the back of the first trailer and the forward hitch of the converter dolly, and the king-pin plate or fifth-wheel interconnection between the dolly and the front of the rearward trailer. In situations such as these, it is very difficult to back up the rig without odd or unpredictable accordion action taking place.

As a consequence, various devices have been engineered to lock points of articulation to bring about a more controlled movement. In certain commercially available configurations, an extensible pin is located forwardly or rearwardly of the king-pin plate, but on the king-pin plate itself. While this allows the king-pin plate to pivot with respect to a pivoting axis situated transverse to the direction of vehicle movement, problems may arise when driving over, or backing up, on pronounced inclines, in which case the pin is substantially pulled out of the aperture used to engage the pin in its extended position. If the vehicle is turned with this pin extracted, a strong moment may be exerted on the pin, shearing it off.

Other attempts at solving this problem have used pins oriented along the pivotal axis of the king-pin plate, but the pins are mounted on the plate itself, which creates other problems. In U.S. Pat. No. 5,456,483 to Madsen et al, for example, two retractable pins (22) are mounted on the king-pin plate itself, and very near to the plate center. This configuration is deficient for at least two reasons. Firstly, the manufacturers of king-pin plates typically specify that no modification should be done to the plate which could cause operational problems. Modification of the plate itself also forces replacement of the entire king-pin plate in the event of shearing or malfunction. But in addition, with respect to design of the '483 patent in particular, the pins are too close to the center pivot point, such that the forces on the pins themselves would be very large, as are the forced applied to the fore and aft rocking pins of the king-pin plate.

U.S. Pat. No. 4,775,165 to Grovum teaches an apparatus very similar to that set forth in the '483 patent, except that the retractable pins are mounted on side panels, also attached to the king-pin plate itself. Again, direct attachment to the king-pin plate is less than optimal for this purpose. U.S. Pat. No. 5,098,115 to Haire et al utilizes retractable pins forwardly of the king-pin plate, but, once again, mounted directly thereon. Although this allows the pivot king-pin plate to continue its pivoting action as the trailer moves over inclined surfaces, mounting to the king-pin plate creates potential problems with manufacture and maintenance, if not with safety.

SUMMARY OF THE INVENTION

The present invention resides in a locking mechanism for an articulating trailer of the type which couples to a king-pin plate, and improves upon the existing art by providing a arrangement for locking the trailer in a non-articulated position while allowing the king-pin plate to continue pivoting.

In a preferred embodiment, one or more apertures are formed on one of the trailer and the trailer-pulling unit, and one or more powered locking members are disposed on the other of the trailer and trailer-pulling unit. Each member is moveable between an extended position, wherein it engages with a respective aperture, and a retracted position, wherein the member is disengaged from the aperture.

Importantly, each member is positioned along a line parallel to the axis about which the king-pin plate pivots, enabling the plate to continue pivoting even when the members are extended. The aperture is also preferably oval shaped to allow for unimpeded pivoting of the trailer attached to the king-pin plate while the locking member is engaged within the aperture.

In the preferred embodiment, the aperture is formed on the trailer, and the powered locking member is supported on the trailer-pulling unit. In addition, two sets of powered locking members and associated apertures are preferably used, one set on either side of the king-pin plate. The locking member is preferably pneumatically powered, though hydraulic, mechanical or other alternatives may be employed.

The invention is applicable to a variety of implementations, including roll-off type trailers and dump trailers using joe-dog configurations.

BRIEF DESCRIPTION OF THE DRAWING

The drawing illustrates, from an oblique perspective, a preferred embodiment of the invention.

DETAILED DESCRIPTION OF THE INVENTION

In contrast to prior-art and commercially available devices, this invention solves the problem of locking an articulating trailer into a non-articulating position by locating one or more retractable pins on either side of a king-pin plate, but not on the plate itself. The pins are located on-axis with the pivoting axis of the king-pin plate, thereby allowing the plate to continue pivoting while not requiring that it be modified to take advantage of these principles.

Making reference to the FIGURE, a preferred arrangement of the invention is set forth generally at 102. Although this particular configuration illustrates application of the invention with respect to a converter dolly or "joe-dog" of the type used to interconnect first and second trailers, it should be noted that the applicable is equally well suited to direct connection between a tractor having a king-pin plate and a single trailer, thereby defeating articulation all together. Nor is the invention limited to the type of trailer being pulled, but is applicable to roll-off type trailers, dump trailers, and so forth.

Continuing the reference to the FIGURE, king-pin plate 106 is mounted on a bed 104 forming the joe-dog, which includes a forward hitch 105 adapted for attachment to a forward trailer (not shown). The king-pin plate 106 pivots about an axis 108 by virtue of flanges and pins underneath the plate which are only partially visible in this FIGURE.

On one side or both of the plate 106, there are located extensible/retractable pins 110 and 112. In a preferred embodiment, these pins are disposed in cylindrical sleeves welded to the frame of the unit 104. An air-actuated cam at 120 drives a lever arm 118 which hingedly applies pressure to the bottom of the pin 110, pushing it upwardly to engage with an aperture 134 on the trailer being pulled. Again, in a preferred embodiment, two such extensible/retractable pin assemblies are used on either side of the king-pin plate 106, with the operation of both being coordinated and essentially identical. Although hydraulic, mechanical or electrical (i.e., solenoid-operated) pin mechanisms-may be used, in a preferred embodiment it was found that air-actuated levers present an effective and economical drive means for the pins.

Also in the preferred embodiment, the apertures 132 and 134 are made into oval or slotted-shapes running lengthwise of the trailer 130, such that as the king-pin plate 106 pivots about axis 108, the pins, if extended, may have a certain degree of give in their respective apertures, thereby minimizing excessive force which might shear the pins. However, since the axis of each pin intersects with the axis 108 of the pivoting king-pin plate, this, in conjunction with the slotted apertures, reduces mechanical stress, even when the turn is attempted with the vehicle while backing up, for example.

Another advantage of the mechanism of the invention is that, since the pins must go up to engage, the fail-safe mode of operation is for the pins to fall out, thereby allowing articulation without the application of externally applied power. That is, although the pins may be located on the trailer and the apertures located on the pulling apparatus, the non-activated mode may cause the pins to fall out of the sleeves and into the apertures, leading to a potentially dangerous situation if traveling at high speed.

I claim:

1. A locking mechanism for a multi-axle trailer, comprising:

a "joe-dog" type trailer-pulling unit having at least one axle with wheels and a king-pin plate to receive the king pin of a trailer, the plate being pivotable fore and aft about a transverse axis parallel to the wheel axle;

an aperture formed on one of the trailer and the trailer-pulling unit; and a powered locking member disposed on the other of the trailer and trailer-pulling unit, the locking member being moveable along an axis between an extended position wherein the member engages with the aperture and a retracted position wherein the member is not engaged with the aperture, and wherein the axis of member movement intersects with the transverse axis about which the king-pin plate pivots thereby maintaining the axle of the trailer-pulling unit, and the axles of the trailer in parallel when the member is engaged.

2. The mechanism of claim 1, wherein the aperture is formed on the trailer and the powered locking member is supported on the trailer-pulling unit.

3. The mechanism of claim 1, further including two sets of powered locking members and associated apertures, one set on either side of the king-pin plate.

4. The mechanism of claim 1, wherein the aperture is oval shaped to allow for unimpeded pivoting of the trailer attached to the king-pin plate while the locking member is engaged within the aperture.

5. The mechanism of claim 1, wherein the trailer is of the roll-off type.

6. The mechanism of claim 1, wherein the trailer is of the dump type.

\* \* \* \* \*